US011652579B2

(12) United States Patent
Gunes et al.

(10) Patent No.: US 11,652,579 B2
(45) Date of Patent: May 16, 2023

(54) APPARATUS AND METHOD FOR IMPROVED UPLINK JOINT RECEPTION COORDINATED MULTI-POINT (COMP) USING A FAKE HARQ PROCESS

(71) Applicant: ULAK HABERLESME A.S., Cankaya / Ankara (TR)

(72) Inventors: Rohat Gunes, Istanbul (TR); Mehmet Can Buyukyavuz, Istanbul (TR); Ilke Altin, Gothenburg (SE); Ali Arsal, Ankara (TR)

(73) Assignee: ULAK HABERLESME A.S., Ankara (TR)

( * ) Notice: Subject to any disclaimer, the term of this patent is extended or adjusted under 35 U.S.C. 154(b) by 0 days.

(21) Appl. No.: 17/667,936

(22) Filed: Feb. 9, 2022

(65) Prior Publication Data

US 2022/0255679 A1    Aug. 11, 2022

Related U.S. Application Data

(60) Provisional application No. 63/148,101, filed on Feb. 10, 2021.

(51) Int. Cl.
*H04L 1/1812* (2023.01)
*H04L 1/00* (2006.01)

(52) U.S. Cl.
CPC .......... *H04L 1/1819* (2013.01); *H04L 1/0061* (2013.01)

(58) Field of Classification Search
CPC ................ H04L 1/1819; H04L 1/0061; H04L 1/1845; H04L 1/1822
See application file for complete search history.

(56) References Cited

U.S. PATENT DOCUMENTS

| 9,319,196 B2 | 4/2016 | Lee et al. | |
| 2017/0310434 A1* | 10/2017 | Harada | ............... H04L 27/0006 |
| 2018/0220413 A1* | 8/2018 | Yang | ..................... H04W 72/56 |

FOREIGN PATENT DOCUMENTS

EP    3182662 A1    6/2017

OTHER PUBLICATIONS

H. Long, W. Xiang, S. Shen, Y. Zhang, K. Zheng and W. Wang, "Analysis of Conditional Error Rate and Combining Schemes in HARQ," in IEEE Transactions on Signal Processing, vol. 60, No. 5, pp. 2677-2682, May 2012. (Year: 2012).*

(Continued)

*Primary Examiner* — Cynthia Britt
(74) *Attorney, Agent, or Firm* — Bayramoglu Law Offices LLC

(57) ABSTRACT

An apparatus and method for a base station (BS) in a cellular network for uplink (UL) Joint Reception of Coordinated Multi Point (JR-CoMP) operations, wherein the User Equipment (UE) sends to the serving and coordinating Radio Units (RUs) a first data block, wherein because of different channel qualities, first data block arriving as second data block at serving RU and as third data block at coordinating RU, respectively. The Baseband Unit (BBU) associated with these RUs using two nested HARQ processes: First, a 'fake' HARQ process to combine the separately channel processed second data block with the third data block; then, a real HARQ process to combine the fake HARQ-combined data block with the retransmitted first data block. Fake HARQ uses Chase Combining while real HARQ uses Incremental-Redundancy Combining.

20 Claims, 8 Drawing Sheets

(56) References Cited

OTHER PUBLICATIONS

E. Zedini, A. Chelli and M. -S. Alouini, "On the Performance Analysis of Hybrid ARQ With Incremental Redundancy and With Code Combining Over Free-Space Optical Channels With Pointing Errors," in IEEE Photonics Journal, vol. 6, No. 4, pp. 1-18, Aug. 2014, Art No. 7902118. (Year: 2014).*

Shang et al., "Performance of Uplink Joint Reception CoMP with Antenna Selection for Reducing Complexity in LTE-A Systems," 2015 IEEE Wireless Communications and Networking Conference (WCNC), Mar. 9, 2015, pp. 977-982.

Jang et al., "On the Combining Schemes for MIMO Systems with Hybrid ARQ," IEEE Transactions on Wireless Communications, Feb. 20, 2009, 8(2), pp. 836-842.

"Keystone Architecture Bit Rate Coprocessor (BCP) User's Guide," Texas Instruments (Literature No. SPRUGZ1A), Aug. 2011 (revised May 2015), pp. 1-212.

"LTE; Evolved Universal Terrestrial Radio Access (E-UTRA); Medium Access Control (MAC) protocol specification (3GPP TS 36.321 version 10.1.0 Release 10)," ETSI TS 136 321, V10.1.0, Apr. 2011, pp. 1-55.

"3rd Generation Partnership Project; Technical Specification Group Radio Access Network; Study on CU-DU lower layer split for NR; Release 15," 3GPP TR 38.816, V15.0.0, Dec. 2017, pp. 1-16.

"3rd Generation Partnership Project; Technical Specification Group Radio Access Network; Coordinated multi-point operation for LTE physical layer aspects (Release 11)," 3GPP TR 36.819, V11.2.0, Sep. 2013, pp. 1-70.

"Overview of 3GPP Release 11 V0.2.0 (Sep. 2014)," www.3gpp.org/specifications/releases/60-release-11, pp. 1-179.

* cited by examiner

APPARATUS AND METHOD FOR IMPROVED UPLINK JOINT RECEPTION COORDINATED MULTI-POINT (COMP) USING A FAKE HARQ PROCESS

RELATED APPLICATION

This application claims the benefit of provisional application 63/148,101 filed Feb. 10, 2021.

BACKGROUND OF THE INVENTION

Field of Invention

The present invention relates generally to an apparatus and method for a base station of LTE or 5G network wherein the number of retransmissions due to erroneous data blocks and block errors are drastically reduced, and more specifically to using a fake HARQ technique in Up Link Joint Reception of CoMP.

ACRONYMS AND DEFINITIONS

3GPP 3rd Generation Partnership Program
BBU Base-Band Unit
BER Bit Error Rate
BLER Block Error Rate
BS Base Station
CRC Cyclical Redundancy Check
CoMP Coordinated Multi-Point
CSI Channel State Information
CU Centralized Unit
DL Down Link
DU Distributed Unit
eNB eNodeB (BS of LTE network)
FEC Forward Error Correction
FFT Fast Fourier Transform
gNB gNodeB (BS of 5G network)
HARQ Hybrid Automatic Repeat Request
ICI Inter Cell Interference
IRC Interference Rejecting Combining
JP Joint Reception
LLR Log Likelihood Ratio
LTE Long Term Evolution
MIMO Multi Input Multi Output
MRC Maximum Ratio Combining
RLC Radio Link Control
RU/RRU Radio Unit
OFDMA Orthogonal Frequency Division Multiple Access
QPSK Quadrature Phase Shift Keying
RAN Radio Access Network
RX Receiver
RU Radio Unit
SC-FDMA Single Carrier Frequency Division Multiple Access
SNR Signal to Noise Ration
TX Transmitter
UE User Equipment
UL Up Link

DISCUSSION OF RELATED ART

Any discussion of the prior art throughout the specification should in no way be considered as an admission that such prior art is widely known or forms part of common general knowledge in the field.

One of the key features introduced with LTE according to 3GPP is Coordinated Multi Point (CoMP) that is introduced in R11 specification (see GPP Release 11, https://www.3gpp.org/specifications/releases/69-release-11). The aim with CoMP is to improve network performance for User Equipment (UE) located at the edge of multiple cells. While providing better performance for UE, CoMP also results in notable spectral efficiency gains (see Shang et al., "Performance of Uplink Joint Reception CoMP with Antenna Selection for Reducing Complexity in LTE-A Systems."). In CoMP scenario, the UE is located at the boundary of it's so-called 'serving cell' as well as another adjacent cell known as the 'coordinating (or interfering) cell'. A number of TX (transmit) points provide coordinated transmission in the Down Link (DL) direction (i.e., from the base stations towards the UE), the UE receiving from all transmit points the same data block. Reciprocally, coordinated reception is provided in the Up Link (UL) direction (i.e., from the UE towards multiple base stations) wherein a number of RX (receive) points receive the same data block from the UE. These TX and RX points are on the antennas of the base station.

There are two types of CoMP from the point of view of coordinated cell selection: intra-site and inter-site CoMP. For intra-site CoMP, the coordination is among the cells generated within the same base station (eNB); for inter-site CoMP, the coordinating cell(s) can be in another eNB. In intra-site CoMP, all the information exchange is done within the eNB site. In contrast, inter-site CoMP relies on connection between adjacent eNBs for information exchange. The eNBs for inter-site CoMP are interconnected in the form a centralized Radio Access Network (C-RAN) wherein the antennas (i.e. TX/RX points) sit in Remote Radio Units (RRU or simply RU) that process radio frequency cellular signals. The RUs are connected via fiber optic fronthaul network to a central Base-Band Unit (BBU) that performs all upper layer signal processing. The aforementioned CoMP function is implemented in the BBU to combine received signals coming from different channels/RRUs.

The RAN architecture must be able to provide sufficient coordination and synchronization among different TX/RX points and/or cells/sites in CoMP, which introduces an added complexity. When inter-eNB coordination is enabled, both UE data and Channel State Information (CSI) will be made available to BBU; thus, low-latency and high-capacity backhaul, preferably fiber optic, would be required.

Joint processing in the UL direction is called 'Joint Reception', and therefore UL CoMP is called JR-CoMP. A number of RX-points receive the same UL data from the UE, and then the received data is combined to improve signal quality. Wireless transmission may cause major signal degradation due to channel noise, and therefore attaining a better signal quality using the method of combining is highly important.

The Interference Rejection Combining (IRC) is known in prior art as a combining method suitable when cells overlap that causes significant interference. IRC is applied to demodulated I/Q samples, i.e., transmitted baseband complex-valued signals, representing those samples of the constellation for the type of modulation used, such as Quadrature Phase Shift Keying (QPSK). In LTE, reference/pilot symbols are transmitted at known time-frequency grid locations (such that they don't interfere with one another), from which the receiver can perform the channel estimation, e.g., determine the signal to noise ratio, channel covariance matrix, etc. IRC method first performs spatially noise-whitening of the received signals before any further processing, and then combines the signals according to a criterion such as the Maximum Ratio Combining (MRC) that maximizes SNR.

These combining methods in prior art suffer from requiring large buffer sizes to store the real and imaginary components of I/Q samples coming from different channels before combining. Furthermore, there is high noise-correlation between the UL channels due to strong co-channel interference because of proximity. Thus, the combining method fails to yield accurate results.

Several other combining methods are proposed in prior art in addition to MRC and IRC. For example, in patent application EP3182662A1, the inventors propose a method for combining soft-bits using Log Likelihood Ratio (LLR) to remedy the aforementioned shortcomings.

One of the key processes used in wireless transmission where signal to noise ratio (SNR) is an issue, is retransmission of blocks of data (a series of bits) that are corrupted. A technique known as channel coding is used to correct errors that may occur in transmission through a noisy channel. The channel code, also referred as the Forward Error Correction (FEC) code, usually comprises some number of bits added to each block of data. The channel code is transmitted along with the actual data, and are decoded on the receiving side so that errors in the transmitted data block can be detected and eventually corrected. In order to provide the FEC, the encoder at the TX point derives error code bits directly from the data block's bits by means of a mathematical coding method. Multiple channel encoding methods are used for wireless transmission in prior art, one of which is 'Turbo Code'. The process through which a data block is encoded or decoded with Turbo Codes is known as Turbo Code Processing (TCP).

Residual transmission errors are detected by a Cyclical Redundancy Code (CRC) added to the FEC-encoded data block. In the case of aforementioned UL case, the base station receiving the UE's turbo encoded data block will first extract the CRC code appended to the encoded data block and will check the CRC to determine if the encoded data block is corrupted or not. If it is not corrupted, the base station will send an ACK packet to the UE, and proceed with decoding the data block using the TCP. In the mean time, the UE will go ahead and send the next data block.

If the data block is corrupted, i.e., fail the CRC check; the base station will request the UE to retransmit the same data block by sending it a NACK packet. Although the same data block will be retransmitted, it most likely differs from the received previous version because of time diversity. This process is known in prior art as the Hybrid Automatic Repeat Request (HARQ) process (see 3GPP TS 36.321 version 10.1.0 Release 10, 'LTE; Evolved Universal Terrestrial Radio Access (E-UTRA); Medium Access Control (MAC) protocol specification') that continues until the data block is correctly recovered from retransmissions, or a maximum number of retransmissions count is exceeded. After combining the newly received data block with the old one, the receiver decodes the combined data block. This procedure repeats until no further errors are detected after combining.

One unique aspect of HARQ is that instead of discarding previously received erroneous data blocks; it stores them in a HARQ buffer so that they can be combined with the newly received retransmissions.

In summary, HARQ process for a wireless UL channel refers to (i) checking the CRC, (ii) the transmission of an ACK or NACK towards the UE, (iii) storing the erroneous data blocks in the HARQ buffer, (iv) waiting for retransmitted blocks, and (v) combining retransmitted data block(s) with the erroneous data block(s) received before. The HARQ buffer (also known as soft buffer) stores data blocks of multiple parallel HARQ processes initiated by the base station for different channels and different UEs. HARQ buffer also stores the combining method's parameters.

In order to support parallel HARQ processes, each formatted UL resource grant on the channel includes a HARQ Process Indicator (HPI) corresponding to an associated original data block. Each erroneous data block is stored in the HARQ buffer with its associated HPI. The UE must retransmit the data block to the base station tagged with the HPI associated with the original data block. When the retransmitted data block is received, the base station delivers it to the HARQ process along with its associated HPI.

Combining data blocks through HARQ process is called 'soft combining'. While it is possible that the first and subsequent transmissions of the same data block can't individually be decoded without any errors due to channel's quality, the combination of the erroneously received transmissions has enough information to pass the CRC check. There are two main soft combining methods in HARQ: Chase combining: Each re-transmission contains exactly the same data block as the original transmission (except parity bits). The receiver combines the received bits with the same bits from previous transmissions wherein bit values may differ. Incremental-Redundancy combining: Each re-transmission contains different information from the data block than the previous transmission. The re-transmission typically uses a different set of coded bits than the previous transmission, with different redundancy versions, which are generated by the so-called 'puncturing' the encoder output. Thus, at every re-transmission the receiver gains different information. It has been shown that Incremental-Redundancy combining almost always performs better than Chase combining, but there is increased complexity due to the puncturing process.

There are several techniques for combining information in HARQ, one of which is known as Likely Log Ratio (LLR) combining (see E. Jang, 1. Lee, H. Lou, and J. M. Cioffi, "On the combining schemes for MIMO systems with hybrid ARQ"). Instead of utilizing receive filter to maximize the SNR as in MRC and IRC combining of I/Q symbols, HARQ combining directly combines soft-bits. It optimizes the parameter most-closely related to the decoding performance, i.e., the log-likelihood ratio (LLR) that is a widely used soft-bit information metric. It is basically an indicative of the confidence in zero ('0') or one ('1') value for each bit. A positive LLR value may indicate more confidence in that bit actually being '0', a negative LLR value may indicate more confidence in '1'. An LLR value of zero may indicate equal likelihood of being '0' or '1'. The receiver may take each bit in the transmitted and HARQ-retransmitted versions of the data block on a noisy channel, and decide whether that bit is 0 or 1 based on the corresponding LLR values.

The aforementioned JR-CoMP, CRC check, and HARQ process apply to 5G networks as well. In 5G RAN architecture, the Broadband Unit (BBU) functionality of an eNB is split into two separate functional units: a distributed unit (DU), responsible for real-time physical layer and lower MAC layer/scheduling functions, and a centralized unit (CU) responsible only for non-real time, higher layer functions (see 3GPP Release 15, Specification #38.816). According to this functional split, RU or RRU is the radio unit that houses the antenna arrays providing digital beam-forming functionality. RU has physical layer functions such as Fast Fourier Transform/Inverse Fast Fourier transform (FFT/IFFT), and resource mapping and de-mapping. The actual functional split between CU, DU and RU may be different depending on the specific use-case and implementation. The DU is usually collocated with RUs on-site, and conducts all intense real-time processing tasks such as CoMP, HARQ, TCP, and MAC functions.

In summary, because all extra bits stuffed along with the original data block, such as FEC bits, CRC bits, and HPI bits, the transmission process comes with significantly lower throughput than the actual bandwidth. Furthermore, retransmissions of the same data block via HARQ process cause transmission delays, which is particularly penalizing for ultra-low delay applications. Therefore, the goal is to design the network with least number of retransmissions. The present invention aims at fulfilling this goal by reducing the CRC errors and thereby reducing the number of HARQ retransmissions.

Embodiments of the present invention are an improvement over prior art systems and methods.

SUMMARY OF THE INVENTION

In one embodiment, the present invention provides a base station comprising: (a) a memory configured to store: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different; (b) a first main processor receiving, as input, the first packet, where the first main processor is configured to perform error checking and upper physical layer processing of the first packet; (c) a second main processor receiving, as input, the second packet, where the second main processor is configured to perform error checking and upper physical layer processing of the second packet; and (d) a third co-processor receiving, as inputs, processed packets in (b) and (c), the third co-processor configured to execute one or more instructions to implement a nested HARQ mechanism comprising: (1) an inner loop process, the inner loop process comprising a first fake HARQ process to combine bits of the first packet and the second packet to form a first combined packet by processing the first packet as the second packet's retransmission, and when the first combined packet does not pass an error check; (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check; (3) recombining the first combined packet and the second combined packet to form a recombined packet by processing the second combined packet as the first combined packet's retransmission, and when the recombined packet does not pass the error check, repeating (2) and (3) until the recombined packet passes the error check; wherein the inner loop process and outer loop process are configured to eliminate bit errors.

In another embodiment, the present invention provides a method as implemented in a base station comprising: (a) storing in a memory: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different; (b) receiving as input, at a first main processor, the first packet, where the first main processor is configured to perform error checking and upper physical layer processing of the first packet; (c) receiving as input, at a second main processor, the second packet, where the second main processor is configured to perform error checking and upper physical layer processing of the second packet; and (d) receiving, as inputs, at a third co-processor, processed packets in (b) and (c), the third co-processor configured to execute one or more instructions to implement a nested HARQ mechanism comprising: (1) an inner loop process, the inner loop process comprising a first fake HARQ process to combine bits of the first packet and the second packet to form a first combined packet by processing the first packet as the second packet's retransmission, and when the first combined packet does not pass an error check; (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check; (3) recombining the first combined packet and the second combined packet to form a recombined packet by processing the second combined packet as the first combined packet's retransmission, and when the recombined packet does not pass the error check, repeating (2) and (3) until the recombined packet passes the error check; wherein the inner loop process and outer loop process are configured to eliminate bit errors.

In yet another embodiment, the present invention provides an article of manufacture having non-transitory computer readable storage medium comprising computer readable program code executable stored in a base station to implement a method to eliminate bit errors, said non-transitory computer readable storage medium comprising: (a) computer readable program code storing in a memory: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different; (b) computer readable program code receiving as input, at a first main processor, the first packet, where the first main processor is configured to perform error checking and upper physical layer processing of the first packet; (c) computer readable program code receiving as input, at a second main processor, the second packet, where the second main processor is configured to perform error checking and upper physical layer processing of the second packet; and (d) computer readable program receiving, as inputs, at a third co-processor, processed packets in (b) and (c), the third co-processor configured to execute one or more instructions to implement a nested HARQ mechanism comprising: (1) an inner loop process, the inner loop process comprising a first fake HARQ process to combine bits of the first packet and the second packet to form a first combined packet by processing the first packet as the second packet's retransmission, and when the first combined packet does not pass an error check; (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check; (3) recombining the first combined packet and the second combined packet to form a recombined packet by processing the second combined packet as the first combined packet's retransmission, and when the recombined packet does not pass the error check, repeating (2) and (3) until the recombined packet passes the error check; wherein the inner loop process and outer loop process are configured to eliminate bit errors.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
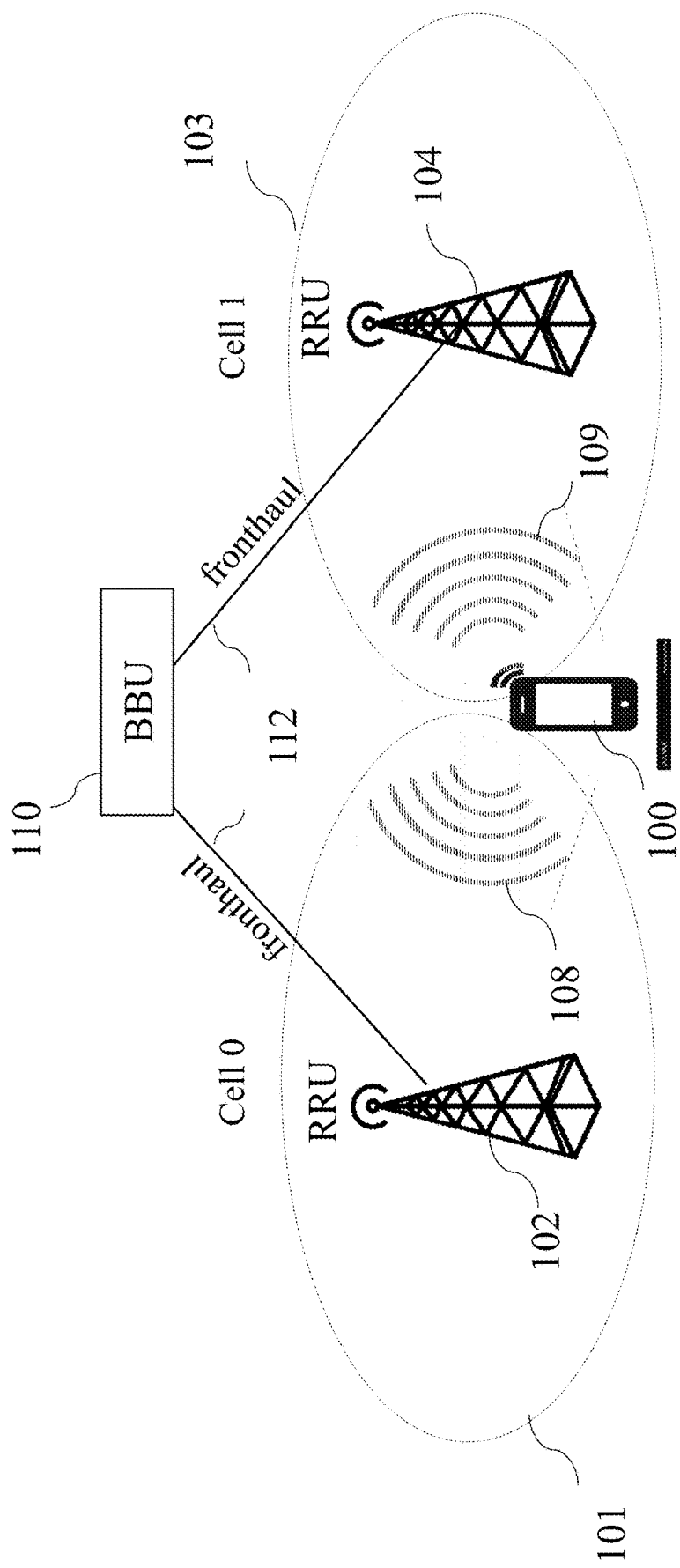
FIG. 1 illustrates a simple prior art configuration of CoMP with serving and coordinating base stations.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Embodiments of this invention are a system and several methods employed within an RX point (i.e., a receiver, which is either an eNB or gNB, and more specifically either in a BBU or CU) to provide a new method of combining in UL JR-CoMP from serving and coordinated cell(s).

According to an aspect of this invention, the receiver separately processes the encoded data block received through a plurality of cells (as opposed to combining them according to prior art using IRC or MRC), so that they are combined at a data block level. More channel information (such as time-varying aspect of the channel conditions) is available at a data block level that allows a much more accurate combining, as opposed to a myopic symbol level combining. Furthermore, IRC/MRC combining methods require large buffer space to store I/Q symbols (as opposed to HARQ buffers that require to store only soft-bits).

The data blocks arrive at the receiver by having varying SNR levels, and therefore may differ from the original data block due to channel errors. The combining of received data blocks from different channels is made possible by implementing a 'fake HARQ process' according to a method of invention, wherein a data block transmitted though one cell is used as a HARQ input to the same data block transmitted through other cell(s). After applying the chase combining method between these separately processed data blocks, and when it is determined that the errors are not corrected in the combined data block through a CRC check, the system of invention pushes the chase-combined encoded data block to the actual HARQ buffer, and initiates the normal HARQ process towards the UE for a retransmission of the original block, and finally performs incremental redundancy combining after the re-transmission. If the CRC check succeeds prior or after chase-combining, the process moves to the step of decoding the data block. Chase combining is used in fake HARQ process according to this invention because UE's data block arriving through different serving and coordinating cells are indeed replicas, i.e., encoded the same way, but arriving corrupted due to the channel conditions.

In summary, the embodiments of this invention use two nested HARQ processes: a fake HARQ process to combine data blocks coming through different channels, and a real HARQ process to combine the retransmitted data blocks with the previously combined data block through fake HARQ process, wherein the retransmitted data blocks through different channels are also pre-combined using fake HARQ process before getting combined with the real HARQ process.

FIG. 1 illustrates a simple LTE network configuration with two base stations. RRU 102 and 104 jointly provide the CoMP operations to UE 100 that is located at the edge of Cell 0 and Cell 1, labeled as 101 and 103, respectively. RRU 102 and 104 are connected to BBU 110 through a fiber optic fronthaul network 112 to transmit data received from UE 100 as well as their respective channel state information (CSI). Each RRU has a data channel as well as a signaling channel towards the BBU on links 112. UE 100 is configured to transmit each data blocks to both RRU 102 and 104 through wireless channels 108 and 109, each channel with possibly different channel signal to noise ratios (SNRs) and therefore different bit error rates (BERs). Note that the channel noise in the UL channels 108 and 109 may be strongly correlated, as they are geographically nearby, and time-varying due to change in weather conditions (rain, snow, fog, etc.), shadows, fading, etc.

Figure 2:
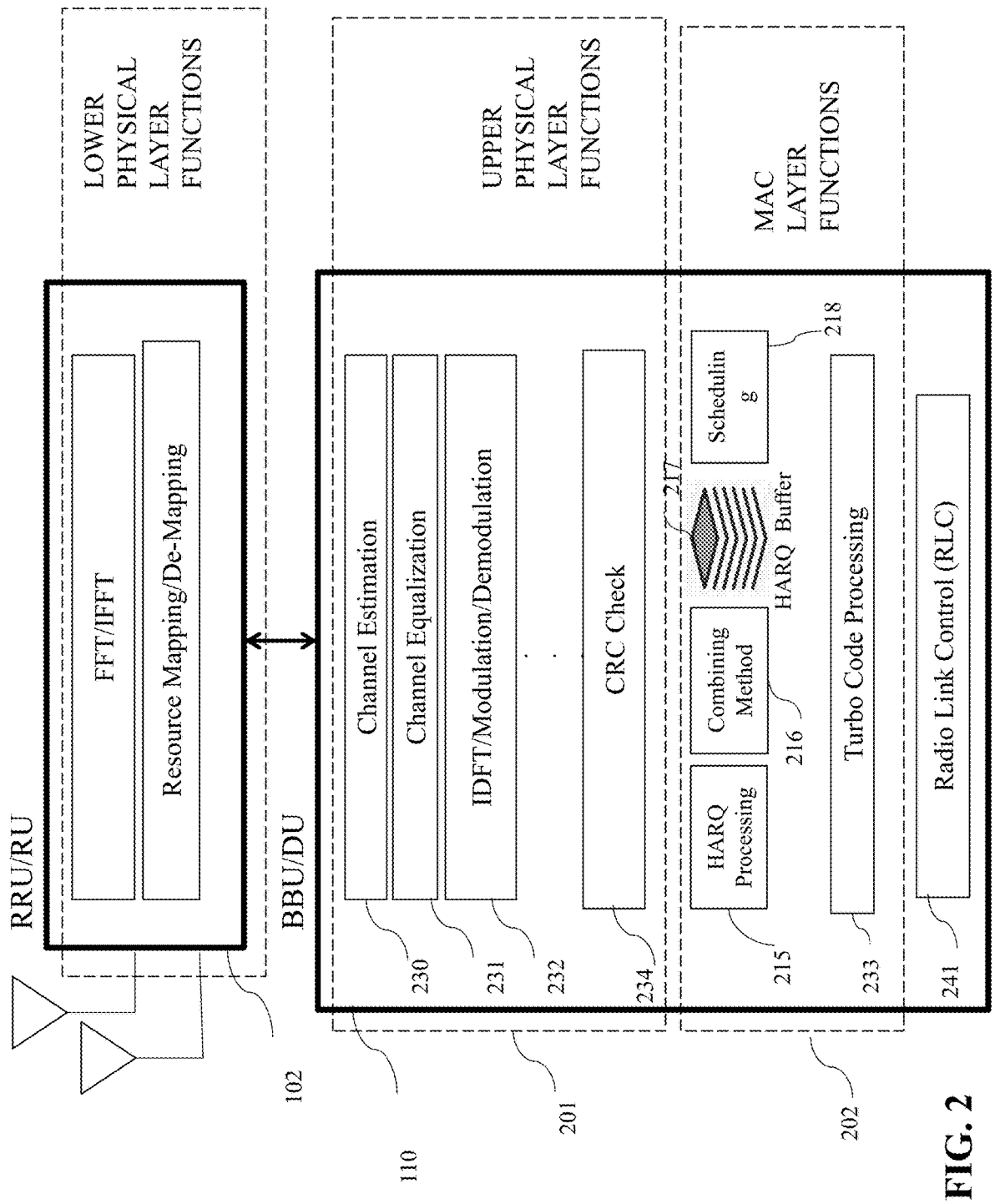
FIG. 2 illustrates the functional split between RRU/RU and BBU/DU according to prior art.

FIG. 2 illustrates a high-level functional split between RRU 102/104 and BBU 110 using the protocol layers of the Open System Interconnect (OSI) protocol stack according to in prior art. Essentially, the same functional split applies between RU and DU in a 5G network. The RRU 102 has the real-time radio frequency functions that are known as lower physical layer functions such as Fast Fourier Transform (FFT) and Inverse FFT (IFFT) as well as resource mapping and de-mapping functions. RRU 102 has the antenna arrays for radio transmission and reception. BBU 110 has the higher physical layer functions grouped as block 201, and MAC layer functions grouped as block 202. The sub-functions in 201 include channel estimation 230, channel equalization 231, Inverse Discreet Fourier Transform (IDFT)/modulation/demodulation 232 etc. CRC check 234 is also included in processing block 201. MAC layer functions in block 202 include HARQ processing 215, Combining Method 216 used for HARQ processing 215, HARQ Buffer 217, Scheduler 218, and Turbo Code Processing (TCP) 233. As a result of protocol processing at MAC layer, the data errors in the UL transmitted encoded data block are detected and corrected, and the data block is correctly decoded and handed over to Radio Link Control (RLC) 241.

Figure 3:
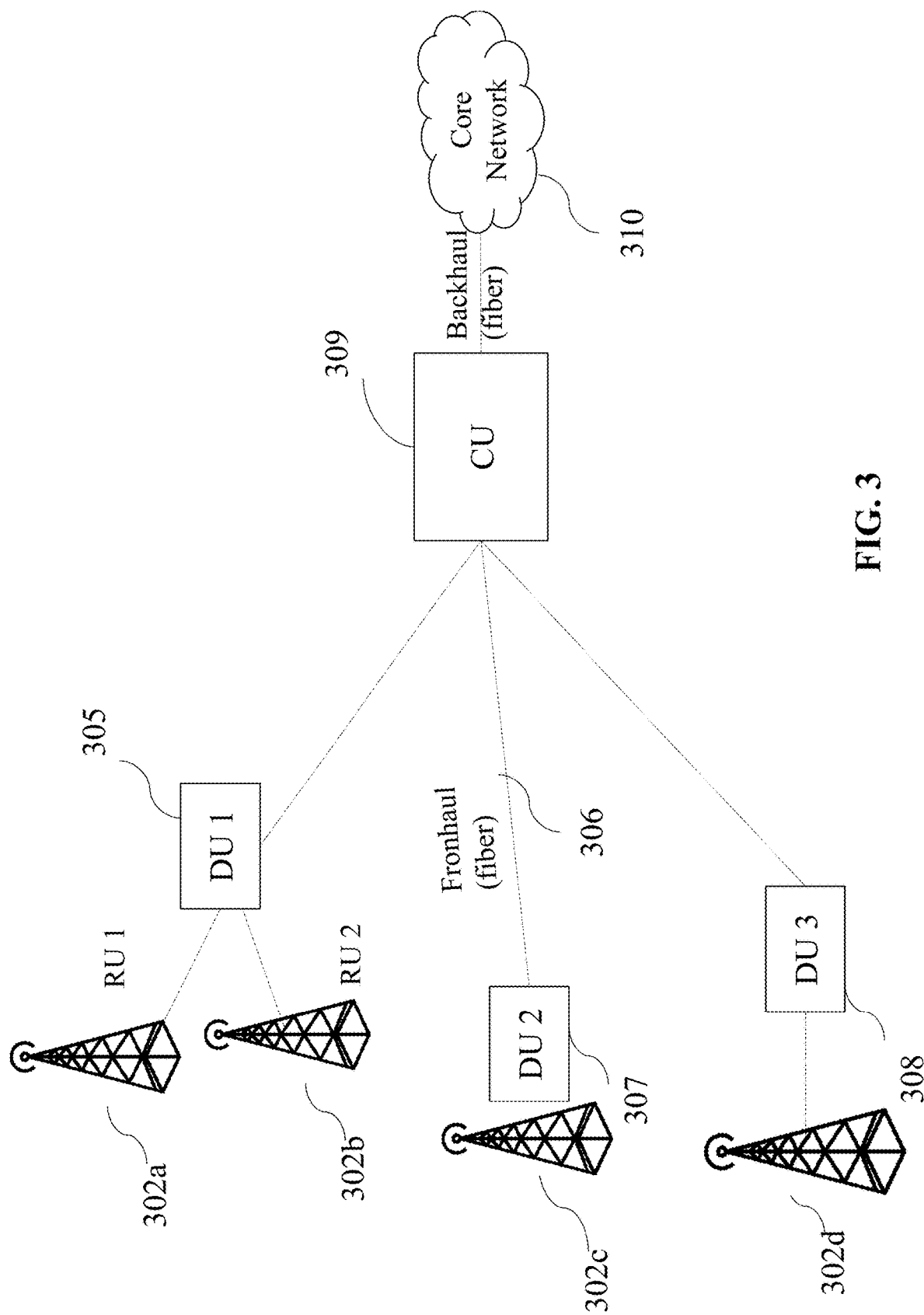
FIG. 3 illustrates a simple prior art configuration of a RAN in a 5G network.

A prior art network configuration for a 5G network wherein CoMP is applicable is provided in FIG. 3. CU 309 is connected to the core mobile network 310 that performs control and data layer functions through a wire-line backhaul connection. CU 309 may reside in the cloud or in the operator's data center. DU 305, 307 and 308 are connected to CU 309 through fronthaul connection 306, which is usually made of fiber optic. All DUs may be remote to the CU. Alternatively, a DU may be collocated with the CU, or its function may be embedded into the CU. RU 302a, 302b, 302c and 302d provide the radio signal transmission and reception through aforementioned TX and RX points. Some RUs may be collocated with the DU or remote to the DU. Remote RUs are connected to DU with a fiber link, as part of the fronthaul network.

Figure 4:
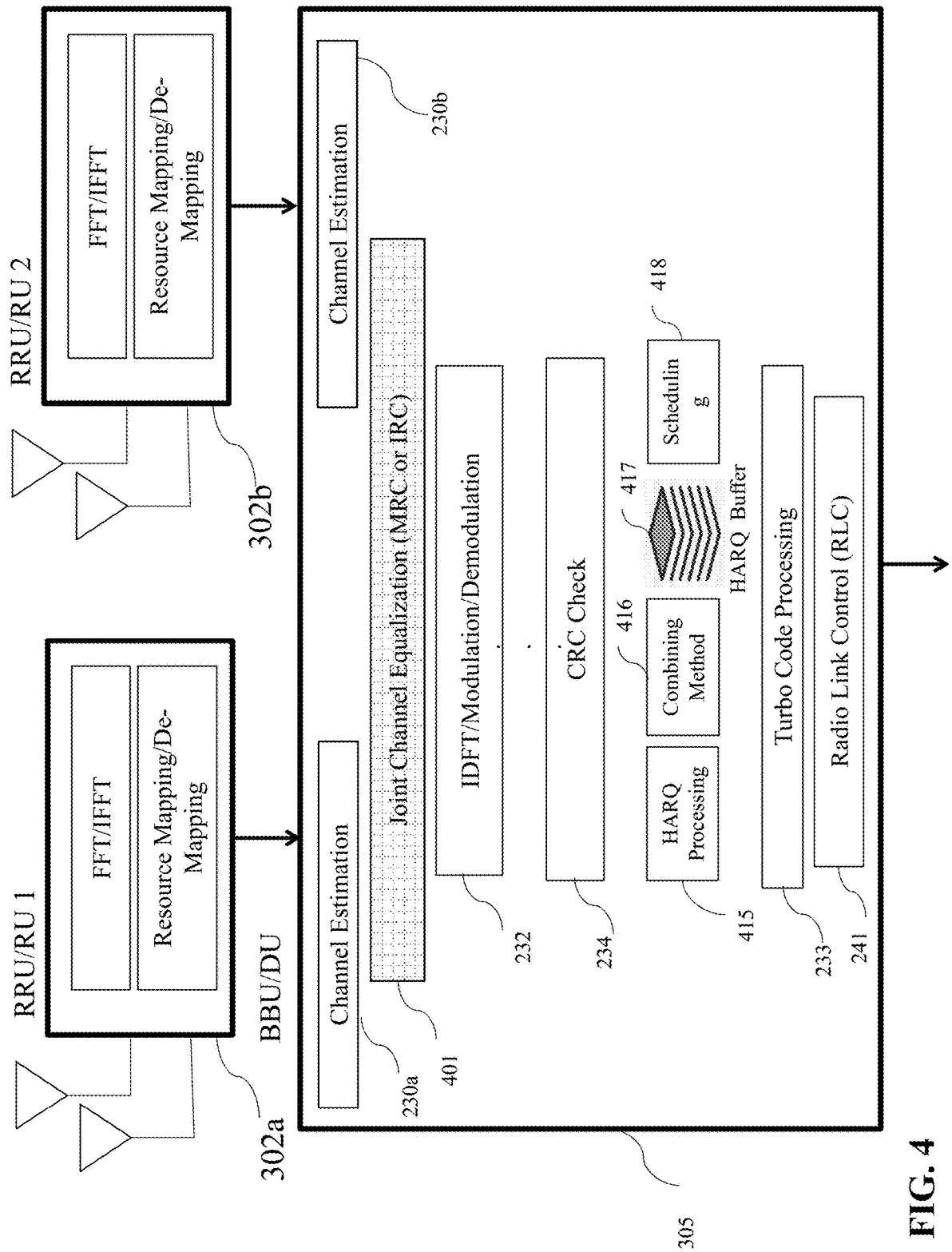
FIG. 4 depicts an exemplary configuration supporting UL JR-CoMP process according to prior art.

FIG. 4 shows the prior art combining method steps used in UL JR-CoMP using the OSI protocol stack. The data block from the UE arrives through two channels, i.e., from RU 302a and RU 302b to DU 305. DU 305's physical-layer function first performs channel estimation 230a and 230b for the first and second channels respectively (serving cell is on RU 302a and coordinating cell is on RU 302b). Note that channel estimation is performed using the pilot symbols injected into each channel. Then, at Joint Channel Equalization 401, the signal samples coming from both channels are combined on a per I/Q sample basis using MRC, IRC or other channel combining methods described before. The rest of the physical and MAC layer process steps apply to the combined signal. The key aspect illustrated in this diagram is that the two signals coming from different channels are combined before any further processing. The combined signal may fail the CRC check, in which case the HARQ process is initiated for retransmission.

Figure 5:
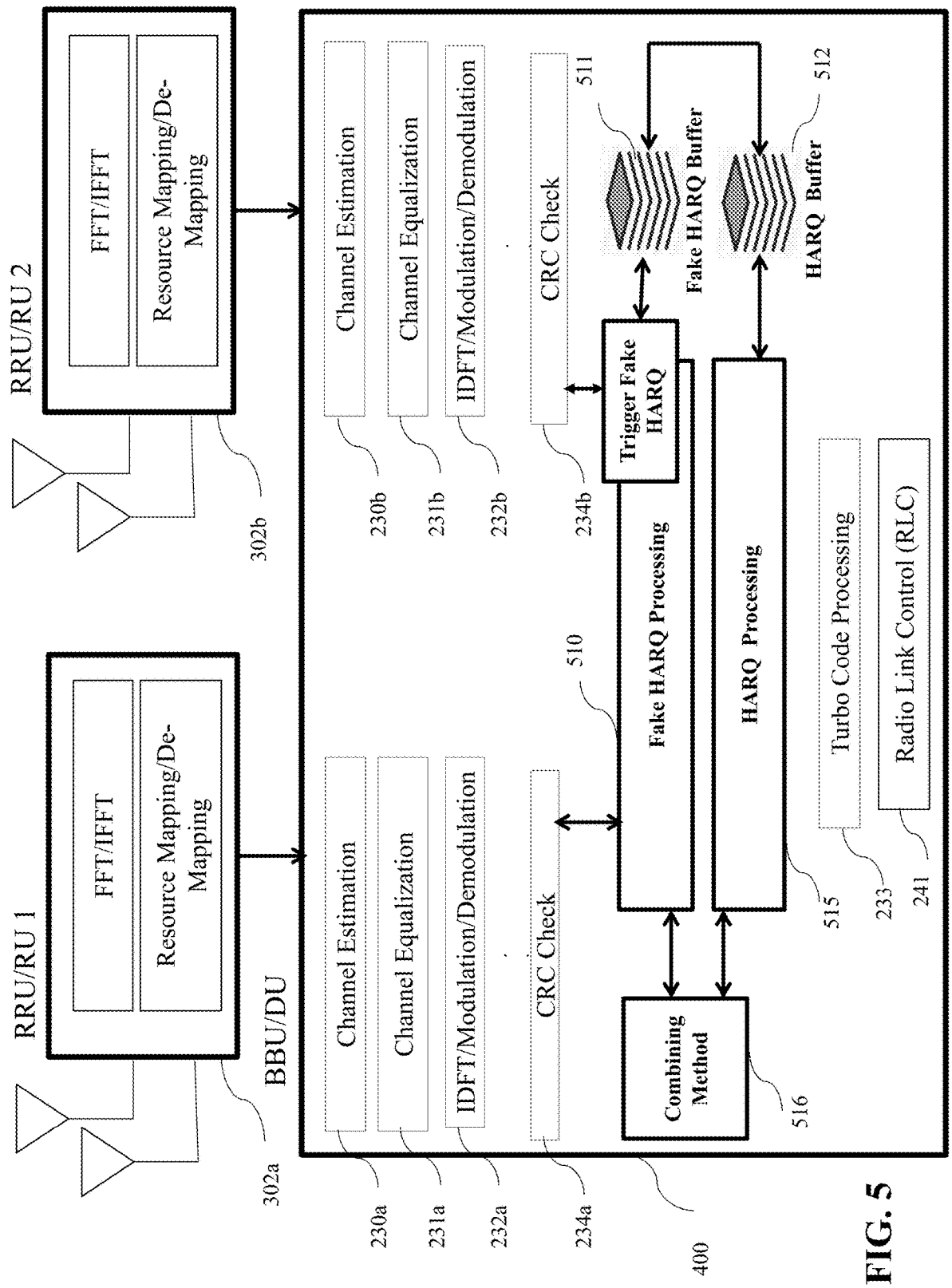
FIG. 5 depicts an exemplary configuration supporting UL JR-CoMP process according to invention.

FIG. 5 illustrates an embodiment of the system of invention showing components and process steps. An important distinction, when compared to FIG. 4, is that the encoded data blocks that arrive through the first and second channels are first individually processed. On RU1 302a's channel, the steps include channel estimation 230a, channel equalization 231a, Inverse Discreet Fourier Transform (IDFT)/modulation/demodulation 232a, etc., and finally CRC check 234a. On RU2 302b's channel, the steps include channel estimation 230b, channel equalization 231b, Inverse Discreet Fourier Transform (IDFT)/modulation/demodulation 232b, etc., and finally CRC check 234b Information coming from each channel is separately processed—as opposed to first being combined according to Joint Channel Equalization 401. Subsequently, the second channel triggers fake HARQ process 510. The HARQ input is provided by the first channel's data block, which is readily stored in fake HARQ buffer 511. Fake HARQ buffer 511 may be part of HARQ Buffer 512, or may be implemented separately. The encoded data blocks (soft-bits) from first and second channels are then combined using chase-combining as if the data block coming through the first channel was a retransmission of the data block coming through the second channel. The chase-combining can be performed on soft-bits using Combining Method 516, known in prior art, wherein corresponding combining parameters for both channels are determined using aforementioned pilot signals and then stored in fake HARQ buffer 511. This step may potentially use a bit-level combining method such as LLR. The chase-combined data block is then pushed to HARQ Buffer 112 for the normal retransmission process, as defined by prior art.

The embodiments of this invention use a nested HARQ process wherein the first HARQ process is called fake HARQ process that aims at combining the data blocks coming through multiple channels, and the second HARQ process is called real HARQ process that aims at combining retransmitted data blocks. Even retransmitted data blocks coming through multiple channels are first combined using fake HARQ process, and then combined with the data block stored in the HARQ buffer. Fake HARQ process uses Chase combining while real HARQ process most likely uses Incremental-Redundancy combining.

Note that there is an important distinction between Combining Method 216 in FIG. 4 and Combining Method 516 in FIG. 5. Combining Method 516 uses combining parameters estimated for the first channel and second channel to perform combining in the fake HARQ process. In stark contrast, Combining Method 216 in the prior art configuration uses combining parameters estimated for the joint virtual (combined/equalized) channel since both transmitted and retransmitted signals are first combined at symbol level prior to any HARQ process. HARQ Processing 415 of prior art, therefore, performs HARQ process for the equalized and combined-channel, while HARQ Processing 515 of this embodiment performs HARQ process for the soft-bit level combined data blocks with potentially another set of combining parameters.

It is important to note that the fake HARQ process relies on chase-combining simply because the encoded data blocks that come through first and second channels contain the same information (data bits as well as CRC bits).

Figure 6:
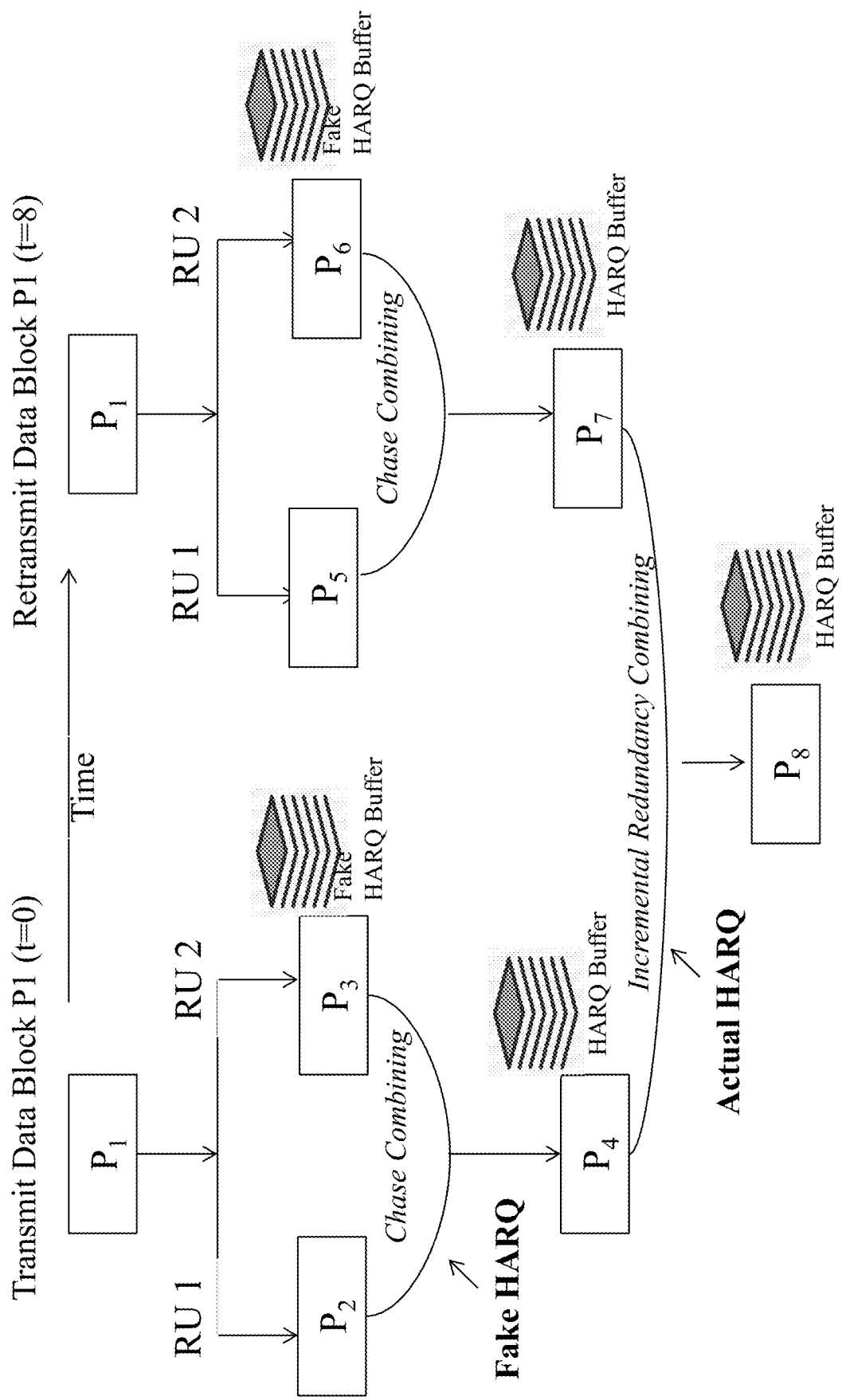
FIG. 6 depicts a diagram showing the fake HARQ and real HARQ soft combining process components according to invention.

FIG. 6 illustrates the successive combining steps with chase-combining and incremental-redundancy-combining according to invention. Data block (or packet) P1 transmitted at time=0 arrives at RU1 and RU2 as P2 and P3 (different than P1 due to channel errors). Also, P2≠P3 due to different channel characteristics. Next, P2 is inserted into the fake HARQ buffer and provided as HARQ input to P3, and then the two are chase-combined into P4. Note that P2 is typically coming from the serving cell while P3 is coming from the coordinating cell. Thus, there is an assumption that P2 is of higher quality than P3, and thus warrants to mimic a retransmission. The combining process can be reversed if P3 was of better quality than P2—i.e., with fewer errors according to their respective CRC checks. If the combined data block P4 still has errors, it is inserted into the HARQ buffer, and the normal HARQ retransmission process is initiated towards the UE by sending NACK messages to the UE from both RU1 and RU2. The retransmission occurs say at time=8 msec. Data block (or packet) P1 is transmitted and arrives at RU1 and RU2 as P5 and P6 this time. P5≠P6 due to different channel characteristics. P2≠P5 and P3≠P6 due to time-varying aspect of each channel characteristics. Next, P5 is inserted into the fake HARQ buffer and provided as HARQ input to P6, and then the two are combined into P7. If P7 passes the CRC check, then the process moves to the next steps. Otherwise, P5 (previously stored in HARQ buffer) is incremental-redundancy combined with P7, generating P8. If P8 still has errors, it is inserted into the HARQ buffer, and the retransmission process is initiated towards the UE by sending NACK messages to the UE both from RU1 and RU2. The recursive process of using nested fake HARQ and then real HARQ continues until there are no CRC errors in the combined block. When the HARQ process yields no errors, an ACK message is sent to RU1 and RU2.

Figure 7:
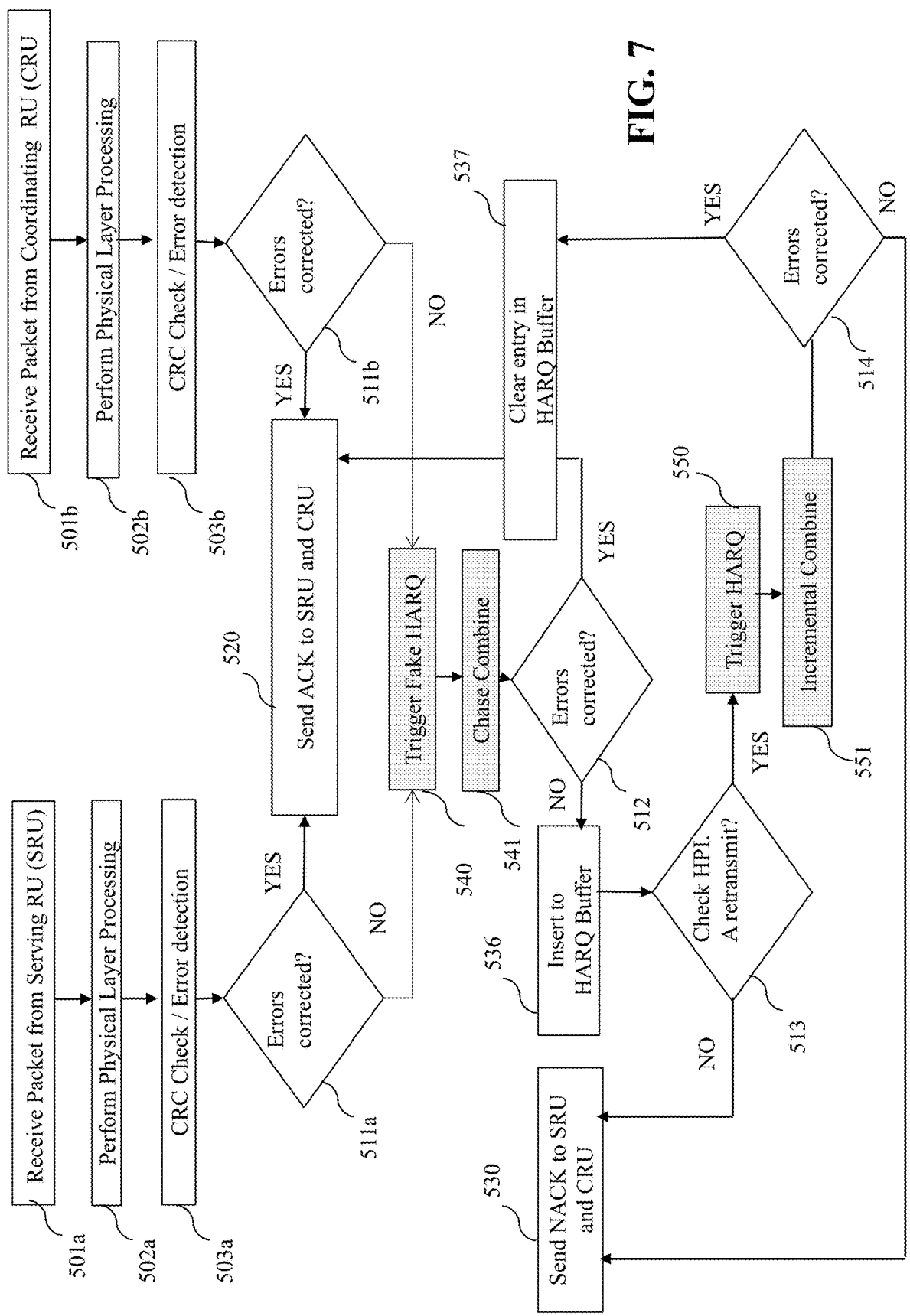
FIG. 7 illustrates a simple flowchart showing a method of invention using nested fake HARQ and real HARQ.

FIG. 7 shows high-level steps of the method of invention. At steps 501a the data block (P2) is received from RU1 (serving cell). Appropriate physical layer functions are performed at Step 502a and the block errors are detected by applying the CRC check in step 503a. The corresponding steps for data block (P3) received from UE on RU2 are performed at steps 501b, 502b, and 503b. At steps 511a and 511b, the system checks to determine if the received data block has any errors. If either of P2 or P3 (or both) has no errors, an ACK is sent towards RU1 and RU2 in step 520. The UE then sends the next data block. If errors are detected, the process goes to step 540 wherein the fake HARQ is triggered. Chase-combining is performed at step 541 using combining parameter values of the channels of RU1 and RU2 producing P4. If errors are corrected according to checkpoint 512, then any entries in HARQ buffer associated with P1 are cleared and an ACK is sent towards RU1 and RU2 at step 520. Otherwise, P4 is inserted into the HARQ buffer in step 536.

At step 513, the checkpoint checks if P4 corresponds to a retransmitted block by checking its HPI. If yes, it triggers the real HARQ process in step 550, and then performs incremental redundancy combining using the previously transmitted versions of the data block in step 551. If packet P4 was the first transmission, then HARQ process starts the NACK process in step 530. At checkpoint 514, the system checks to determine if errors are corrected through the HARQ process. If not, process goes back to step 530. Otherwise, the process goes back to step 537, and so on.

These steps are intended to clarify the understanding the method of invention. The steps may be implemented in a different sequence, each step may have different sub-steps, some checkpoints may have different checks, or checkpoints may be implemented at different stages, etc. All such variations are included in the method of invention. Furthermore, the scenario in this Figure is described only for two channels for simplicity, while the method and system of invention is applicable to a plurality of wireless channels, and a plurality of RRUs/RUs and BBUs/DUs.

Figure 8:
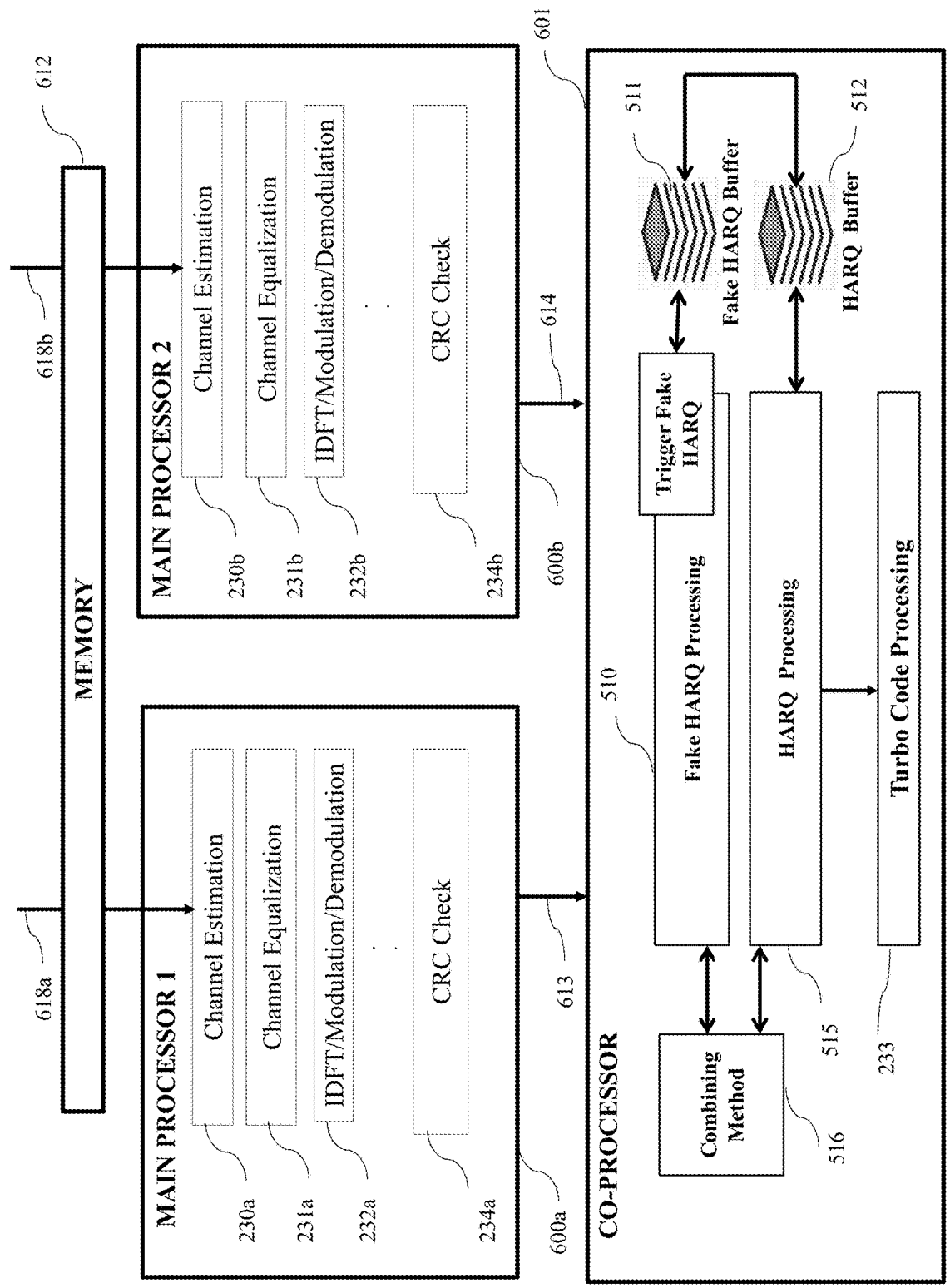
FIG. 8. depicts a diagram showing a configuration of the system functions by mapping to a plurality of processors according to invention.

An efficient exemplary configuration of the system of invention that is part of the BBU (or DU) is illustrated in FIG. 8. Several other components of the BBU (such as I/O interfaces, user interfaces, network interfaces, memory controllers, MAC layer functions, etc.) are not shown to avoid obscuring the aspects that are relevant to the invention. In this configuration, 618a is the data input from RU1 302a (i.e., the serving cell) and 618b is the data input from RU2 302b (i.e., the coordinating cell). Lower physical layer processing of the data is performed in RU1 and RU2 before data block enters BBU. The received data blocks from 618a and 618b are first stored in Memory 612. The upper physical layer processing steps (shown as boxes 230a/230b, 231a/231b, 232a/232b, 234a/234b) are performed at main processors 600a and 600b, for the data blocks coming from the serving cell and coordinated cell, respectively. These two main processors retrieve their respective data blocks from Memory 612 and process essentially in parallel to minimize processing delays. The nested fake HARQ and real HARQ processes, the combining function, fake HARQ buffer and real HARQ buffer are implemented on separate co-processor 601 that can perform bit-level operations (see Texas Instruments, 'Keystone Architecture, Bit Rate Coprocessor, User's Guide', Literature Number: SPRUGZ1A August 2011—Revised May 2015) such as combining and turbo coding/decoding extremely fast. The input to co-processor 601 will come from main processors 600a and 600b.

The data block that arrives on 613 is stored in fake HARQ Buffer 511. On the other hand, the data block that arrives on 614 is used to trigger a fake HARQ in Fake HARQ Processing 510. This process retrieves the data block coming from the serving cell and stored in fake HARQ Buffer 511 as input, and performs Chase-Combining according to Combining Method 516 with the data block coming from the coordinating cell. After combining, the combined data block is stored in HARQ Buffer 512. Although fake HARQ buffer and HARQ buffer are shown as separate buffers for clarity in this configuration, they may be implemented as one buffer. Similarly, fake HARQ and real HARQ processes are shown as separate processes for clarity in this configuration, which may also be implemented as one process.

- The real HARQ Processing 515 is triggered only if errors are detected in fake HARQ-combined data block.
- The real HARQ Processing 515 is not triggered if the fake HARQ-combined data block has no errors.
- The process exits real HARQ only if the HARQ-combined data block has zero errors, or if the retransmission counter exceeds the threshold.
- When the process exists from fake or real HARQ, the Turbo Code Processing 233 is performed on the final combined data block.

In one embodiment, the present invention provides a method as implemented in a base station comprising: (a) storing in a memory: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different; (b) receiving as input, at a first main processor, the first packet, where the first main processor is configured to perform error checking and upper physical layer processing of the first packet; (c) receiving as input, at a second main processor, the second packet, where the second main processor is configured to perform error checking and upper physical layer processing of the second packet; and (d) receiving, as inputs, at a third co-processor, processed packets in (b) and (c), the third co-processor configured to execute one or more instructions to implement a nested HARQ mechanism comprising: (1) an inner loop process, the inner loop process comprising a first fake HARQ process to combine bits of the first packet and the second packet to form a first combined packet by processing the first packet as the second packet's retransmission, and when the first combined packet does not pass an error check; (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check; (3) recombining the first combined packet and the second combined packet to form a recombined packet by processing the second combined packet as the first combined packet's retransmission, and when the recombined packet does not pass the error check, repeating (2) and (3) until the recombined packet passes the error check; wherein the inner loop process and outer loop process are configured to eliminate bit errors.

Although the descriptions are so far provided for two cells (serving and coordinating) for simplicity, the system and method can possibly be extended to support more than two cells without loss of generality.

The exemplary configuration of FIG. 8 uses two main processors and one co-processor. It is possible to use more or a smaller number of processors without loss of generality, or the functions of the co-processor may be performed in one of the processors.

Various embodiments using variants of the method described so far is possible. For example, VOE can optimize only for a specific service type or group of services and ignore all other services. To reflect this choice, the subscriber value (or weight) can be adjusted accordingly to reflect high value for those users using the specific application type. The availability of multiple value functions, V, allows the network operator to choose the cost function that best reflects its operating principles.

Other embodiments not detailed here using the same principles may be considered, for example, moving subscribers from one serving base station to another serving base station for load distribution, or even changing the core network parameters to move around capacity in the network. All these variations and extensions are trivial within the context of this invention.

In one embodiment, the present invention provides an article of manufacture having non-transitory computer readable storage medium comprising computer readable program code executable stored in a base station to implement a method to eliminate bit errors, said non-transitory computer readable storage medium comprising: (a) computer readable program code storing in a memory: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different; (b) computer readable program code receiving as input, at a first main processor, the first packet, where the first main processor is configured to perform error checking and upper physical layer processing of the first packet; (c) computer readable program code receiving as input, at a second main processor, the second packet, where the second main processor is configured to perform error checking and upper physical layer processing of the second packet; and (d) computer readable program receiving, as inputs, at a third co-processor, processed packets in (b) and (c), the third co-processor configured to execute one or more instructions to implement a nested HARQ mechanism comprising: (1) an inner loop process, the inner loop process comprising a first fake HARQ process to combine bits of the first packet and the second packet to form a first combined packet by processing the first packet as the second packet's retransmission, and when the first combined packet does not pass an error check; (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check; (3) recombining the first combined packet and the second combined packet to form a recombined packet by processing the second combined packet as the first combined packet's retransmission, and when the recombined packet does not pass the error check, repeating (2) and (3) until the recombined packet passes the error check; wherein the inner loop process and outer loop process are configured to eliminate bit errors.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method have been shown in the above embodiments for the effective implementation of an apparatus and method for improved uplink joint reception coordinated multi-point (CoMP) using a fake HARQ process. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A base station comprising:
   (a) a memory configured to store: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different;
   (b) a first main processor receiving, as input, the first packet, where the first main processor is configured to perform error checking and upper physical layer processing of the first packet;
   (c) a second main processor receiving, as input, the second packet, where the second main processor is configured to perform error checking and upper physical layer processing of the second packet; and
   (d) a third co-processor receiving, as inputs, processed packets in (b) and (c), the third co-processor configured to execute one or more instructions to implement a nested HARQ mechanism comprising:
      (1) an inner loop process, the inner loop process comprising a first fake HARQ process to combine bits of the first packet and the second packet to form a first combined packet by processing the first packet as the second packet's retransmission, and when the first combined packet does not pass an error check;
      (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check;
      (3) recombining the first combined packet and the second combined packet to form a recombined packet by processing the second combined packet as the first combined packet's retransmission, and when the recombined packet does not pass the error check, repeating (2) and (3) until the recombined packet passes the error check;
   wherein the inner loop process and outer loop process are configured to eliminate bit errors.

2. The base station of claim 1, wherein the base station is any of the following: a Base-Band Unit (BBU) in a Long-Term Evolution (LTE) network, an E-UTRAN Node B or eNodeB, a Distributed Unit (DU), or gNodeB in a 5G network.

3. The base station of claim 1, wherein the one or more characteristics are picked from any of the following: signal-to-noise ratio (SNR) and bit error rate.

4. The base station of claim 1, wherein upper physical layer processing is applied on one or more I/Q symbols and comprise any of, or a combination of the following: channel estimation, channel equalization, Inverse Discreet Fourier Transform (IDFT) and demodulation.

5. The base station of claim 1, wherein bit error checking is performed using a cyclical redundancy code (CRC).

6. The base station of claim 1, wherein the fake HARQ process is configured to utilize Chase-combining.

7. The base station of claim 1, wherein the real HARQ process is configured to utilize incremental-redundancy combining.

8. The base station of claim 1, wherein first and second packets are combined into a single packet by the first fake HARQ process using chase-combining method.

9. The base station of claim 1, wherein the third and fourth retransmitted packets are combined into a single packet by the second fake HARQ process using chase-combining method.

10. The method of claim 1, wherein the real HARQ process is configured to utilize incremental-redundancy combining.

11. A method as implemented in a base station comprising:
    (a) storing in a memory: (1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different;
    (b) receiving as input, at a first main processor, the first packet, where the first main processor is configured to perform error checking and upper physical layer processing of the first packet;
    (c) receiving as input, at a second main processor, the second packet, where the second main processor is configured to perform error checking and upper physical layer processing of the second packet; and
    (d) receiving, as inputs, at a third co-processor, processed packets in (b) and (c), the third co-processor configured to execute one or more instructions to implement a nested HARQ mechanism comprising:
       (1) an inner loop process, the inner loop process comprising a first fake HARQ process to combine bits of the first packet and the second packet to form a first combined packet by processing the first packet as the second packet's retransmission, and when the first combined packet does not pass an error check;
       (2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check;
       (3) recombining the first combined packet and the second combined packet to form a recombined packet by processing the second combined packet as the first combined packet's retransmission, and when the recombined packet does not pass the error check, repeating (2) and (3) until the recombined packet passes the error check;

wherein the inner loop process and outer loop process are configured to eliminate bit errors.

12. The method of claim 11, wherein the base station is any of the following: a Base-Band Unit (BBU) in a Long-Term Evolution (LTE) network, an E-UTRAN Node B or eNodeB, a Distributed Unit (DU), or gNodeB in a 5G network.

13. The method of claim 11, wherein the one or more characteristics are picked from any of the following: signal-to-noise ratio (SNR) and bit error rate.

14. The method of claim 11, wherein upper physical layer processing is applied on one or more I/Q symbols and comprise any of, or a combination of the following: channel estimation, channel equalization, Inverse Discreet Fourier Transform (IDFT) and demodulation.

15. The method of claim 11, wherein bit error checking is performed using a cyclical redundancy code (CRC).

16. The method of claim 11, wherein the fake HARQ process is configured to utilize Chase-combining.

17. The method of claim 11, wherein the real HARQ process is configured to utilize incremental-redundancy combining.

18. The method of claim 11, wherein first and second packets are combined into a single packet by the first fake HARQ process using chase-combining method.

19. The method of claim 11, wherein the third and fourth retransmitted packets are combined into a single packet by the second fake HARQ process using chase-combining method.

20. An article of manufacture having non-transitory computer readable storage medium comprising computer readable program code executable stored in a base station to implement a method to eliminate bit errors, said non-transitory computer readable storage medium comprising:
(a) computer readable program code storing in a memory:
(1) a first packet received from a first radio unit (RU) associated with one or more serving cells over a first uplink wireless channel, and (2) a second packet received from a second RU associated with one or more coordinated cells over a second uplink wireless channel, wherein the first uplink wireless channel and the second uplink wireless channel having one or more characteristics that are different;
(b) computer readable program code receiving as input, at a first main processor, the first packet, where the first main processor is configured to perform error checking and upper physical layer processing of the first packet;
(c) computer readable program code receiving as input, at a second main processor, the second packet, where the second main processor is configured to perform error checking and upper physical layer processing of the second packet; and
(d) computer readable program receiving, as inputs, at a third co-processor, processed packets in (b) and (c), the third co-processor configured to execute one or more instructions to implement a nested HARQ mechanism comprising:
(1) an inner loop process, the inner loop process comprising a first fake HARQ process to combine bits of the first packet and the second packet to form a first combined packet by processing the first packet as the second packet's retransmission, and when the first combined packet does not pass an error check;
(2) an outer loop process, the outer loop process comprising a real HARQ process to: (a) receive a third retransmitted packet received over the first uplink wireless channel, the third retransmitted packet corresponding to the first packet that was previously received, (b) receive a fourth retransmitted packet received over the second uplink wireless channel, the fourth retransmitted packet corresponding to the second packet that were received previously, and (c) combine, via another inner loop process comprising a second fake HARQ process, bits of the third packet and the fourth packet to form second combined packet by processing third packet as fourth packet's retransmission, and when the second combined packet does not pass the error check;
(3) recombining the first combined packet and the second combined packet to form a recombined packet by processing the second combined packet as the first combined packet's retransmission, and when the recombined packet does not pass the error check, repeating (2) and (3) until the recombined packet passes the error check;

wherein the inner loop process and outer loop process are configured to eliminate bit errors.

* * * * *